(12) United States Patent
Kemp

(10) Patent No.: US 8,799,169 B2
(45) Date of Patent: Aug. 5, 2014

(54) METHOD FOR RECOMMENDATION OF AUDIO

(75) Inventor: Thomas Kemp, Esslingen (DE)

(73) Assignee: Sony Corporation, Tokyo (JP)

( * ) Notice: Subject to any disclaimer, the term of this patent is extended or adjusted under 35 U.S.C. 154(b) by 817 days.

(21) Appl. No.: 12/369,352

(22) Filed: Feb. 11, 2009

(65) Prior Publication Data

US 2009/0228333 A1     Sep. 10, 2009

(30) Foreign Application Priority Data

Mar. 10, 2008    (EP) ..................................... 08004424

(51) Int. Cl.
G06Q 99/00     (2006.01)
G06Q 30/06     (2012.01)
(52) U.S. Cl.
CPC ...... *G06Q 30/0631* (2013.01); *G06Q 2220/165* (2013.01)
USPC .......................................... 705/58; 705/26.7
(58) Field of Classification Search
USPC ................................................. 705/26.7, 58
See application file for complete search history.

(56) References Cited

U.S. PATENT DOCUMENTS

| | | | |
|---|---|---|---|
| 5,749,081 A | 5/1998 | Whiteis | |
| 6,748,395 B1 * | 6/2004 | Picker et al. ........................ | 1/1 |
| 6,963,975 B1 * | 11/2005 | Weare ........................... | 713/176 |
| 7,013,301 B2 * | 3/2006 | Holm et al. ................... | 707/741 |
| 7,080,253 B2 * | 7/2006 | Weare ........................... | 713/176 |
| 7,487,180 B2 * | 2/2009 | Holm et al. ........................ | 1/1 |
| 7,488,886 B2 | 2/2009 | Kemp | |
| 7,643,994 B2 * | 1/2010 | Kemp ........................... | 704/243 |
| 2005/0102135 A1 | 5/2005 | Goronzy et al. | |
| 2005/0114388 A1 | 5/2005 | Goronzy et al. | |
| 2005/0131688 A1 | 6/2005 | Goronzy et al. | |
| 2005/0160449 A1 | 7/2005 | Goronzy et al. | |
| 2006/0120536 A1 * | 6/2006 | Kemp ........................... | 381/56 |
| 2006/0156326 A1 | 7/2006 | Goronzy et al. | |
| 2008/0201370 A1 | 8/2008 | Kemp et al. | |
| 2008/0215709 A1 | 9/2008 | Kemp | |
| 2008/0276186 A1 | 11/2008 | Feduszczak et al. | |
| 2009/0013002 A1 | 1/2009 | Eggink et al. | |

(Continued)

FOREIGN PATENT DOCUMENTS

| | | |
|---|---|---|
| EP | 0 643 359 A2 | 3/1995 |
| EP | 1 610 529 A1 | 12/2005 |
| EP | 1 667 106 A1 | 6/2006 |
| WO | WO 00/17793 | 3/2000 |

OTHER PUBLICATIONS

U.S. Appl. No. 12/340,085, filed Dec. 19, 2008, Eggink, et al.
U.S. Appl. No. 12/405,569, filed Mar. 17, 2009, Eggink, et al.

(Continued)

*Primary Examiner* — James D Nigh
(74) *Attorney, Agent, or Firm* — Oblon, Spivak, McClelland, Maier & Neustadt, L.L.P.

(57) ABSTRACT

A method for recommendation of a content item, comprising: providing first identifiers for first content items stored on a first device; providing second identifiers for second content items stored on a second device; determining measures for at least a part of said first content items, wherein each measure is associated with a respective content item, and said measure depends on said first and second identifiers; determining or updating, on a third device, an item-to-item matrix based on said measures, wherein said first, second, and third devices are physically separated devices; determining a recommendation for a user based on said item-to-item matrix.

19 Claims, 10 Drawing Sheets

(56) References Cited

U.S. PATENT DOCUMENTS

2009/0031882 A1    2/2009   Kemp et al.
2009/0069914 A1    3/2009   Kemp et al.
2009/0084249 A1    4/2009   Kemp et al.

OTHER PUBLICATIONS

Badrul Sarwar, et al., "Item-Based Collaborative Filtering Recommendation Algorithms", WWW10, May 1-5, 2001, 11 pages.

U.S. Appl. No. 12/593,927, filed Sep. 30, 2009, Kemp.
Chinese Office Action issued on Mar. 16, 2011 in corresponding Chinese Application No. 200910128809.1 filed on Mar. 10, 2009 (English Translation Only).
Office Action issued Dec. 23, 2010, in European Patent Application No. 08004424.1, filed Mar. 10, 2008.
Office Action issued Jun. 15, 2011 in European Patent Application No. 08 004 424.1-2223.
Office Action issued Nov. 23, 2011 in China Application No. 200910128809.1 (With English Translation).

\* cited by examiner

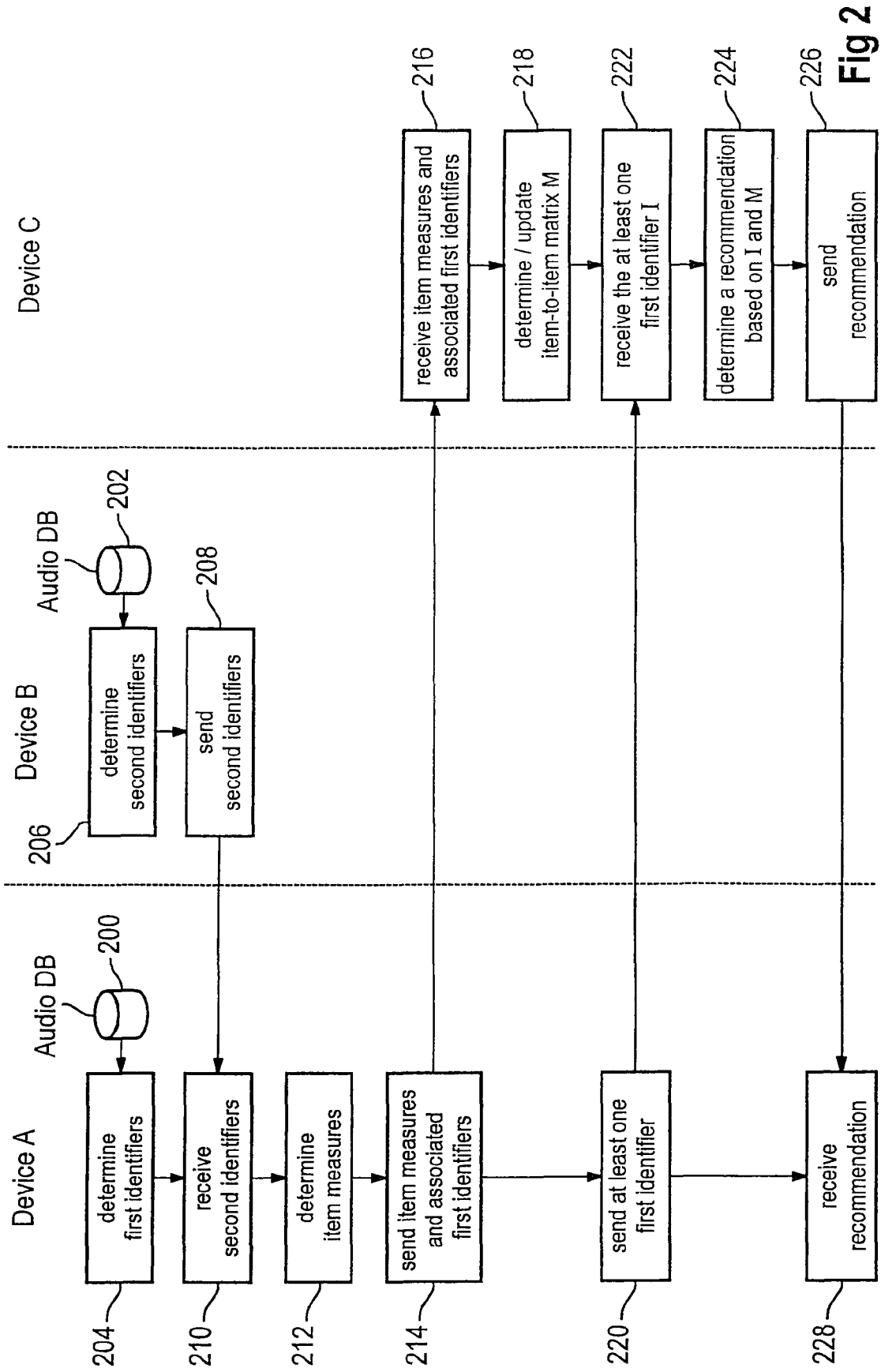

Example: update measures for item X22
in item-to-item matrix at server $$\begin{array}{c|c} & X22 \\ X1 & 0 \\ X2 & 0 \\ X3 & 0.5 \\ X4 & 0 \\ X5 & 0.5 \\ X6 & 0 \\ \vdots & \vdots \\ X21 & 0 \\ X22 & N.A. \\ X23 & 0 \\ \vdots & \vdots \\ X36 & 0 \\ X37 & 0.5 \\ X38 & 0 \\ \vdots & \vdots \\ X51 & 0 \\ X52 & 1.0 \\ X53 & 0 \\ X54 & 0.5 \\ \vdots & \vdots \end{array}$$

etc.

Fig 3B

| Song | owned by A (+0.2) | owned by B (+0.2) | Fav. of A (+0.3) | Fav. of B (+0.3) | Score |
|---|---|---|---|---|---|
| X3  | X | - | X | - | 0.5 |
| X5  | - | X | - | X | 0.5 |
| X22 | X | X | X | X | 1.0 |
| X37 | X | - | - | - | 0.2 |
| X52 | X | X | - | - | 0.4 |
| ⋮ | ⋮ | ⋮ | ⋮ | ⋮ | ⋮ |

Fig 4B

METHOD FOR RECOMMENDATION OF AUDIO

An embodiment of the invention relates to a method for recommendation of audio to a user. A further embodiment of the invention relates to a device for content recommendation. A still further embodiment of the invention relates to a server for generating a recommendation.

BACKGROUND

Today, large audio data bases, e.g. comprising millions of songs or music videos, exist. It is a challenging task for a user to find audio/video data matching his taste.

It is an object of embodiments described in the following to provide recommendations to a user.

This object is solved by a method and respective devices as defined in claims 1, 8, and 15.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 2 is a further block diagram illustrating the interaction of different devices according to further embodiment.

FIGS. 3A and 3B illustrate an embodiment of the method for recommendation and focuses on the calculation of measures for content items.

FIGS. 4A and 4B illustrate a further embodiment of a method for recommendation where measures for content items depend on favorite content items of a user.

DETAILED DESCRIPTION

In the following, embodiments are described. It is important to note that all described embodiments in the following may be combined in any way, i.e. there is no limitation that certain described embodiments may not be combined with others. Further, it should be noted that the same reference signs throughout the Figures denote the same or similar elements.

Figure 1:
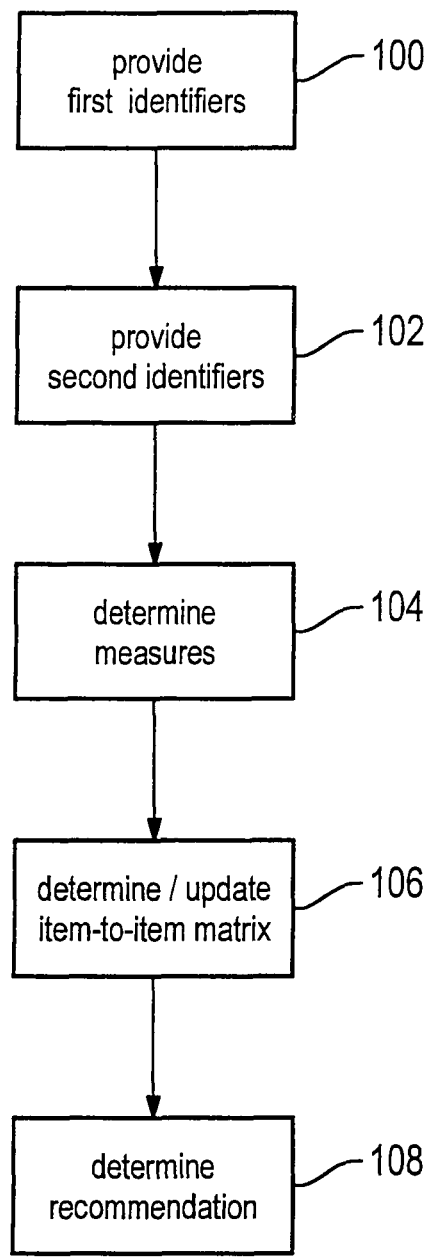
FIG. 1 is a block diagram illustrating an embodiment of a method for recommendation.

In FIG. 1, at 100, first identifiers for first content items are provided. The first identifiers may be calculated for the content items on a first device.

At 102, second identifiers for second content items are provided. The second identifiers may be calculated at a second device.

"Content items" may be pieces of audio or other multimedia items. For example, content items may be songs or music videos or other videos stored on the first and second devices.

The first and second devices may be portable devices and physically separated devices.

At 104, measures are determined for at least a part of the first content items, wherein each measure is associated with a respective content item, and the measure depends on the first and second identifiers. The term "measure" may also be referred to as "score". In an embodiment, the measures may describe a degree of similarity of the taste of a first user of the first device and the taste of a second user of the second device.

The measures may, thus, depend on user dependent information. The user dependent information may comprise a user profile, a user gender, a user age, a user group and/or the like. For example, based on user dependent information, it may be determined that the first and second users have the same or similar age. Thus, the measures may be higher than in cases where users have a different age. The reason is that the two users are found to be similar users and, therefore, are likely to have a similar taste.

At least a part of the measures may also depend on a degree of liking of a respective content item of the first or second user. For example, the second user may have a favorite list which indicates that he/she likes the content items in the favorite list. This information may be used to calculate the measures at the first and/or second device. Thus, the degree of liking may be determined depending on a play list, favorite list, purchase date, purchase price or the like. The degree of liking may also be determined depending on a number of times a respective content item has been played since this is also a measure for the degree of liking of a respective content item. For example, if a user has played a content item many times, he probably likes the content item. Thus, the respective content item may receive a higher score than content items that have been played less frequently.

It is possible that the measures depend on a play list or favorite list of a user of the second device. The measures, however, are determined on the first device. Thus, the second device may transmit to the first device information for each or at least some of the items regarding whether a respective item belongs to a play list and/or favorite list of a user of the second device.

The measures may also depend on a comparison of the first and second identifiers. The comparison thereby may indicate whether a respective content item is the same or not. If the first or second content items are pieces of audio or video data comprising audio information, the first and second identifiers may be fingerprints deter-mined in accordance with European patent application no. 04 028 882.1, the contents of which is herein incorporated by reference.

The fingerprints are data extracted from the audio information of a content item and are small in size. The fingerprint may e.g. have a size of 291 byte which allows to uniquely identify a song. It is, therefore possible to exchange the fingerprints between the different devices with low data traffic. Further, calculation of the fingerprints only requires very little processing time. Thus, it is possible to identify the content items via the fingerprints which have been calculated on mobile devices where processing power is low.

Further, since the content items, e.g. pieces of audio, are identified by fingerprints, it is not necessary to exchange audio data, e.g. MP3-files or the like, between the different devices. Thus, there is no conflict with copyright laws prohibiting such exchange. Also, no personal data need to be exchanged between the first and second devices. Of course, as said, in an embodiment, it is, however, possible to also exchange personal data. Still further, it is not necessary that a server (see description of steps 106, 108 below) knows that a certain user has already used the server. Each time a user uses the system, a complete anonymous login is possible. It is possible that the method solely works by an identification via fingerprints.

In a further embodiment, the first and second devices may be mobile devices, communicating by near-field wireless standards, such as e.g. Bluetooth, Pico-Net, WLAN or the like.

At 106, in FIG. 1, the measures are used to determine and/or update an item-to-item matrix. This may be done on a third device which is physically separated from the first and second devices.

The third device may be a server device to which the first and/or second device may connect.

Based on the item-to-item matrix, the third device may determine a recommendation at 108 for a user.

The item-to-item matrix describes the similarity of items with respect to each other depending on usage information collected via the first and second devices. Thus, a type of collaborative filtering is done, where the data collection is done in a distributed manner on the first and second devices. If a large number of first and second devices by a large number of user all perform the mentioned tasks, then data collection by the many users is very powerful. A lot a data can be collected locally very easy which improves the item-to-item matrix. Thus, it is desirable that a large number of users serve as "data collectors" and, thereby, help to update the item-to-item matrix. As is clear from the above, this is done in a distributed manner on the local devices. Therefore, much data is collectable with very few effort.

Therefore, one drawback of collaborative filtering may be overcome, since by collecting the data locally, problems of data sparsity are less severe than if the collection was done only at the server.

For example, if the server hosts an online music store, and users of mobile devices collect data locally, then an item-to-item matrix may be easily determined which helps to recommend content items (songs) to users of the online music store.

The item-to-item matrix may therefore be regarded as to have been created "piecewise" by a multitude of independent users devices which interact with each other, e.g. by near-field communication or by Bluetooth or some other means. The interaction itself, thereby, may merely consist of an exchange of the fingerprints e.g. of a small number of well liked songs, e.g. frequently played songs, where matches are searched inside the own local collection, and, if such matches are found, the other, non-matched fingerprints are accumulated, and, thus, the above-described measures are determined. The measures may, therefore, be referred to as "a tentative local item-to-item similarity matrix".

The central site (server=third device) may serve as a "data aggregation unit". The central site may receive all the tentative item-to-item matrices (measures) and combines them into a global item-to-item matrix. The identification of the songs is, thereby, done via fingerprints, and recommendations are created for the current users based on the global item-to-item matrix. The user may then be allowed to downstream parts of the recommendations to listen to and to decide whether or not to buy the whole song (content item).

FIG. 2 shows an embodiment illustrating the interaction of three devices A, B, and C (first to third devices).

Devices A and B may be portable devices, such as e.g. portable phones, handheld music storage devices or the like. Devices A and B have audio data bases 200, 202.

At 204 and 206, first and second identifiers are determined for the songs stored in the audio data bases 200 and 202, respectively. The first and second identifiers may be fingerprints e.g. determined as described in European patent application no. 04 028 882.1. Thus, processing time for determining the first and second identifiers may be low and storage required for storing the first and second identifiers is very little.

At 208, device B sends the calculated second identifiers which are descriptive for the content items (songs) stored in audio data base 202 to device A. Device A receives the second identifiers at 210.

At 212, device A determines measures, also referred to as "item measures". This may e.g. be done by comparing the first and second identifiers. This corresponds to comparing the songs stored in audio data base 200 and audio data base 202. Device A may, therefore, determine the measures depending on whether the content items in audio data base 200 are the same as the content items in audio data base 202. It may also be possible to determine the measures depending on a degree of similarity of the audio data in data bases 200 and 202. The similarity measures may, therefore, be determined based on the fingerprints. For each first identifier, i.e. for each content item in data base 200, a measure may be determined.

The calculated measures together with the associated identifiers (songs) in data base 200, at 214, are then sent to device C, which is e.g. a server device.

At 216, the item measures and associated first identifiers are received.

At 218, an item-to-item matrix M stored at the device C is determined/updated. The item-to-item matrix M may also be referred to as "global item-to-item matrix".

In order to determine a recommendation, at 220, device A may sent at least one first identifier to device C, which receives this at least one first identifier 1 at 222. Based on this first identifier and based on the item-to-item matrix M, at 224, a recommendation is determined. At 226, this recommendation is sent to device A, which receives the recommendation at 228.

Figure 3A:
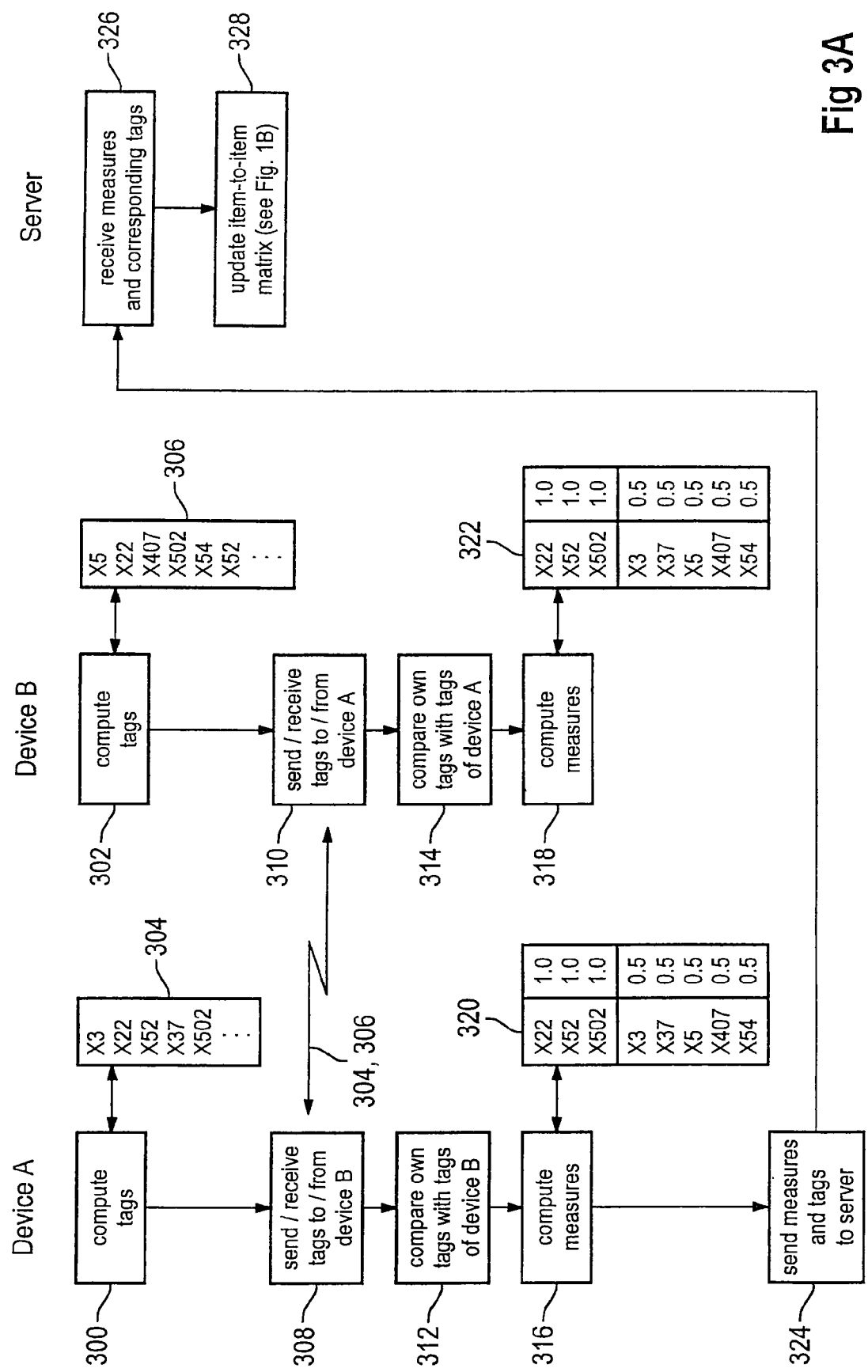

FIGS. 3A and 3B illustrate how the measures (local item-to-item matrix/scores) may be calculated. First, at devices A and B, at 300 and 302, tags of audio data stored on devices A and B are computed.

In the example of FIG. 3A, on device A, the following tags are determined and stored (see reference sign 304): X3, X22, X52, X37, and X502. At device B, the following tags are computed (see reference sign 306 in FIG. 3A): X5, X22, X407, X502, X54, X52.

At 308, 310, the tags 304, 306 are exchanged between devices A and B.

Then, at 312, 314, devices A and B compare their own tags with the tags of the respective other device. Thus, at 312, device A compares its own tags with the tags received from device B. Further, at 314, device B compares its own tags with the tags received from device A. It should be noted that it is not necessary that steps 312, 314 be executed on both devices. It may be that only device A aims at generating a recommendation or updating its measures. Therefore, it may not be necessary that steps 314, 318 be executed on device B. However, in the example of FIG. 3A, it is assumed that both devices A and B serve as data collectors.

At 316 and 318, respective measures are determined.

As seen at 320, in the example of FIG. 3A, the measure (score) of tags (content items) X22, X52, X502 is equal to 1.0.

Further, the measures for items X3, X37, S5, X407, and X54 is equal to 0.5. As can be seen from 304, 306, content items X22, X52, and X502 are commonly owned content items. This is the reason why these content items receive a higher score. By symmetry, device B does the same thing as evident from 318, 322.

At 324, the measures and corresponding tags are sent to the server.

At 326, the server receives the measures and corresponding tags. The measures ("local tentative item-to-item matrix") are then, at 328, used to update the (global) item-to-item matrix.

FIG. 3B illustrates the updating of measures. In FIG. 3B, the update measures for item X22 in the item-to-item matrix at the server is illustrated.

Figure 4A:
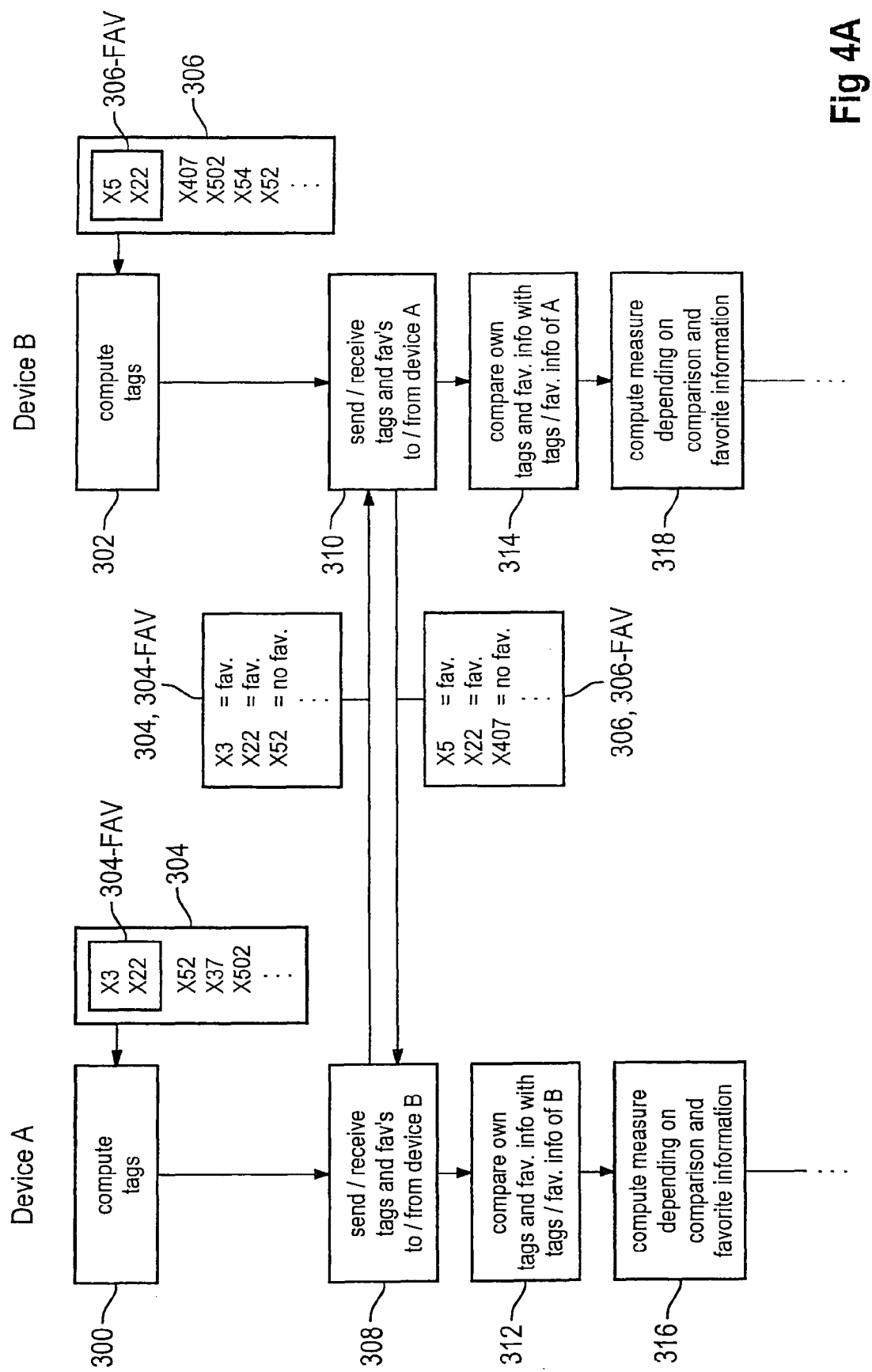

FIGS. 4A and 4B illustrates an embodiment where the measures depend on favorite lists of users of devices A and B.

As in FIG. 3A, at 300, 302, tags are computed for all of the content items stored at 304, 306.

However, in the embodiment of FIG. 4A, the information stored at 304, 306 includes information regarding a degree of liking of certain content items of a user of the respective device. In the example of FIG. 4A, the user of device A has a favorite list 304-FAV (thus implicitly indicating a degree of liking) including items X3 and X22. Further, the user of device B has a favorite list 306-FAV including items X5 and X22.

In steps 308, 310, in addition to the tags stored at 304, 306, the information whether a respective item is included in a favorite list 304-FAV, 306-FAV is transmitted/received.

Then, at 312, 314, the own tags and the favorite information transmitted/received, is compared with the tags/favorite information of the respective other device.

Thus, at 316, 318, the measures are computed depending on a comparison of the tags stored at 304, 306 as well as depending on whether a respective item is in one of the favorite lists 304-FAV, 306-FAV.

This computation of the measures is illustrated in the table of FIG. 4B.

As can be seen, as an example, the measure (score) of song (item) X3 is calculated as follows:

Item X3 is owned by A and in favorite list 304-FAV of the user of device A. The fact that X3 is owned by A results in adding 0.2 to the score. The fact that X3 is in 304-FAV adds 0.3 to the score resulting in a total score of 0.5.

The calculation of the scores (measures) for the other items is done analogously and will be easily recognized by those skilled in the art.

In the embodiment of FIGS. 4A, 4B, all of the tags stored at 304, 306 are exchanged between devices A and B. Thus, devices A and B have the same information. Therefore, the measures calculated at 316, 318 are the same for devices A and B.

Figure 5:
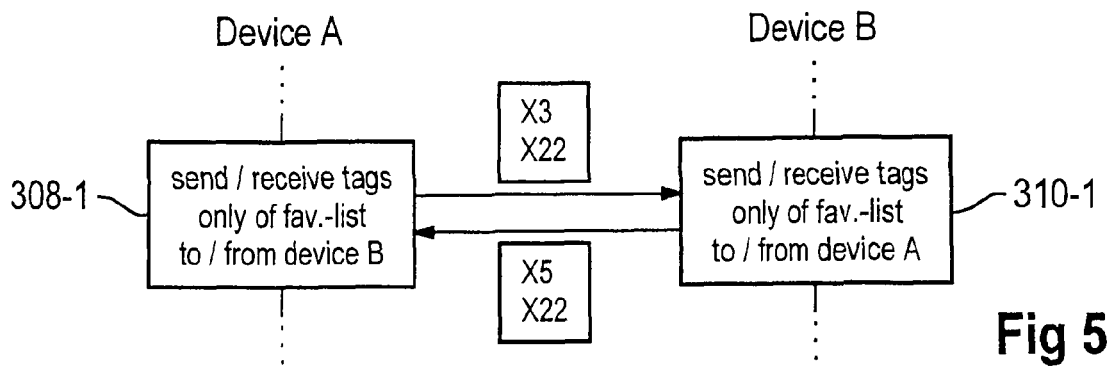
FIG. 5 illustrates an embodiment where only tags of content items of a favorite list are exchanged.

In contrast, in the embodiment of FIG. 5, not all of the items stored in 304, 306 are exchanged. Instead, only the tags of the items in favorite list 304-FAV, 306-FAV are exchanged at 308-1, 310-1. Steps 308-1, 310-1 correspond to steps 308, 310 of FIG. 4A.

Thus, in the embodiment of FIG. 5, devices A and B do not have the same information. Thus, the measures determined at devices A and B may be different.

Figure 6:
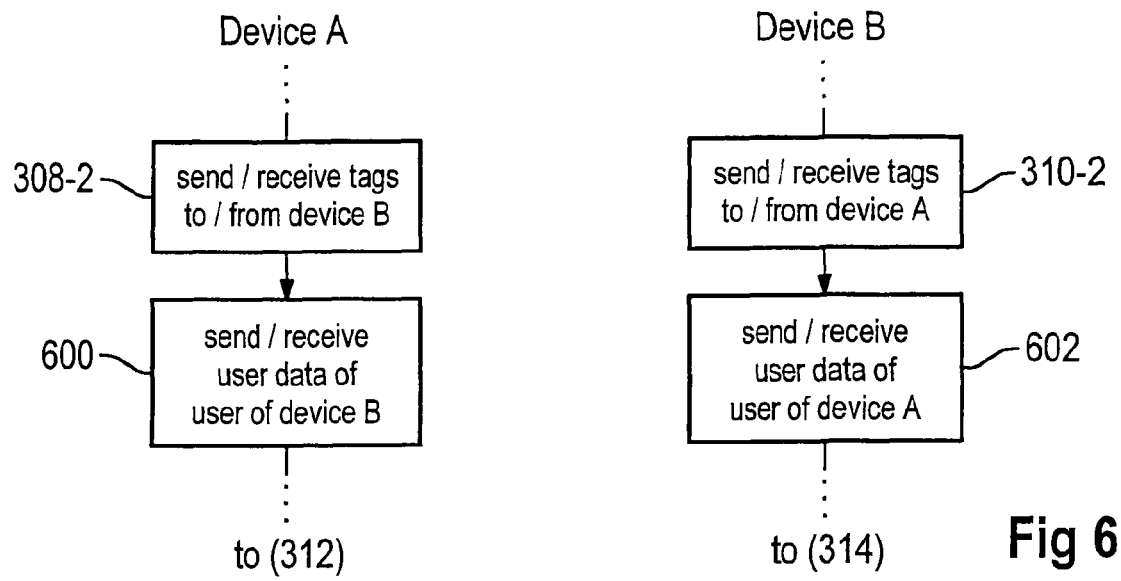
FIG. 6 illustrates a further embodiment where additionally to tags, user data between devices are exchanged.

In FIG. 6, a further embodiment is shown where in addition to tag information, user data of users of devices A and B are exchanged at 600, 602. The user data may include a user profile, user gender, user age, user group and/or the like of a user of the respective device.

In the embodiment of FIG. 6, the measures may, therefore, be determined depending on the user data.

For example, if it is found that the age of the user of device A and the age of the user of device B is the same or similar, the measures may be determined to be higher than in cases where age of users of devices A and B is very different.

Figure 7:
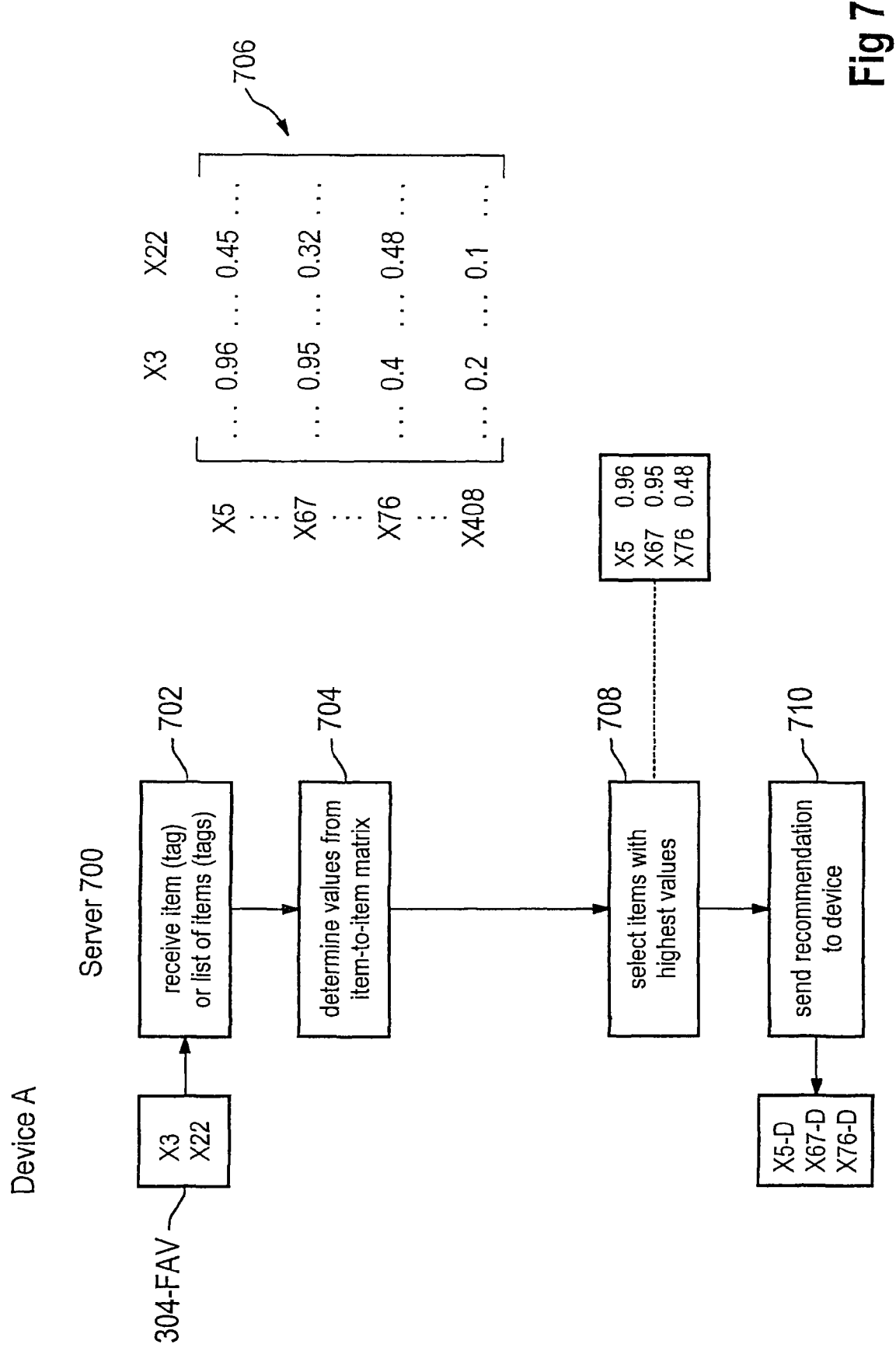
FIG. 7 illustrates how an item-to-item matrix is used to make a recommendation.

FIG. 7 illustrates how, at a server 700, a recommendation may be determined using the item-to-item matrix. At 702, server 700 receives from e.g. device A of FIGS. 3A, 4A, a favorite list 304-FAV.

Server 700, at 704, may then determine values from the global item-to-item matrix 706.

At 708, the items with the highest values are searched. In the example of FIG. 7, these are items X5, X67 and X76.

At 710, respective audio data corresponding to items X5, X67 and X76 is sent to device A.

The audio data X5-D, X67-D, X76-D may only be a part of a corresponding content item, i.e. only a part of a song, e.g. 30 seconds or the like. Based on X5-D, X67-D and X76-D the user may then decide to buy the whole content item.

Figure 8:
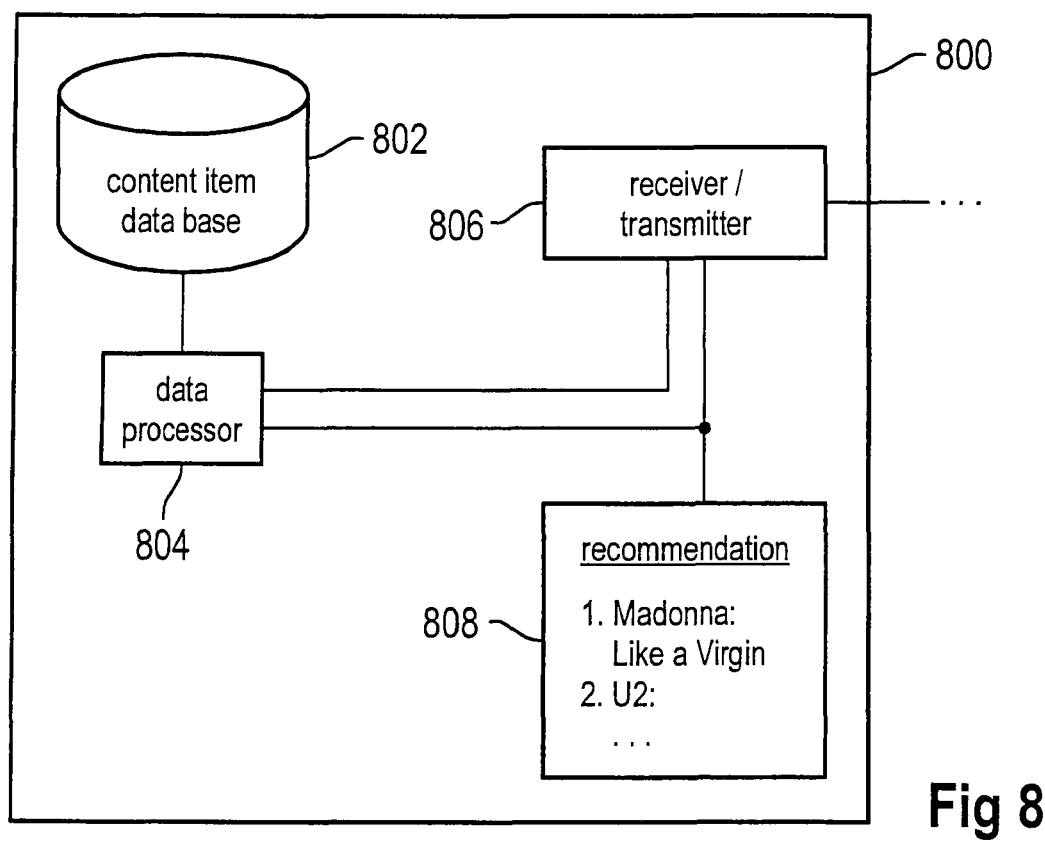
FIG. 8 shows a device for content recommendation.

FIG. 8 shows an embodiment of a device, e.g. a portable device. Device 800 comprises a content item data base, e.g. song data base, 802, a data processor 804, a receiver/transmitter 806, and a display 808.

Receiver/transmitter 806 is adapted to receive second identifiers from another device, e.g. device A or B of the FIGS. 3 to 6. The data processor 804 is adapted to determine first identifiers for the content items stored in content item data base 802, and further adapted to determine measures for at least a part of the first content items, wherein each measure is associated with a respective content item. Further, the measure depends on the first and second identifiers.

Receiver/transmitter 806 is adapted to send the measures and corresponding first content items to a server and, thus, request a recommendation from the server.

When receiving a recommendation, receiver/transmitter 806 and/or data processor 804 may display the recommendation on display 808. In the example of FIG. 8, a recommendation may be the song "Like a virgin" from Madonna. The server may, then, transmit only a part of the song to the user and the user may listen to this part and then decide if he wants to purchase the song or not.

Figure 9:
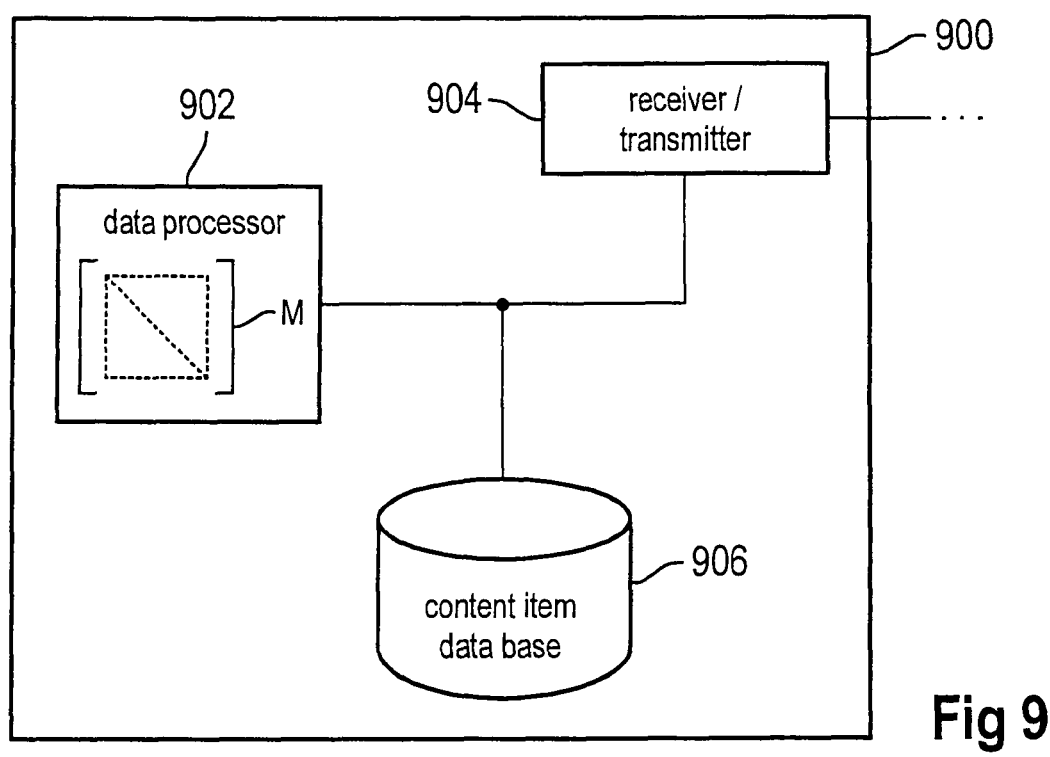
FIG. 9 shows a server device for generating a content recommendation and sending the recommendation to a user device.

FIG. 9 shows a server device 900 comprising a data processor 902, a receiver/transmitter 904 and a content item data base 906.

Receiver/transmitter 904 may be adapted to receive measures for at least a part of first content items, wherein each measure is associated with a respective content item, and the measure depends on first and second identifiers. The first and second identifiers may have been locally determined at first and second devices.

The data processor 902 is adapted to determine or update an item-to-item matrix M based on the received measures.

Data processor 902 is further adapted to select a recommendation from content item data base 906 based on item-to-item matrix M and a given content item.

As is clear from all of the above, the described embodiments help to obtain customer data and, therefore, provide a stable collaborative filtering approach which does not suffer from data sparsity.

As explained above, the usage and preference data collection is decentralized to a multitude of devices. Thus, the main data collection is not necessarily done at a central server. The central server may only do the final merging of the preference data collected locally by e.g. portable devices communicating via some communication channel, e.g. near-field communication.

Thus, according to this approach, an independence of the delivery channel for the music is achieved. Even if the customer buys the music in the record store or at an online music store, collaborative filtering data is collected. Thus, a higher quality of the data is obtained and the actual usage of content items can be employed rather than only the purchasing event. ("No I bought this for my aunt, and I do not want it to ruin my profile.")

Further, there is less server side effort and, there is no need to collect information in a web shop. Further, since the data collection is done locally, there is no need to negotiate with web shop owners or to build up a web shop at all (online music store).

Also, since all of the identification of data (audio data) is done by fingerprints, a complete anonymous service is possible. This has a high sales impact since the user contacts the service "in need of recommendations" which is a particular good moment to present an offer for a purchase.

Similar to the above-described embodiments, in a further embodiment, the frequently played songs on a device may be selected and their fingerprints be computed. Of course, a simple scheme that randomly picks songs on the device or uses the songs that have been transferred most recently to the device or songs that the user have actively selected may also be used. In principle, all songs on a device could be used without discrimination, particularly, if there are not so many of them. The very fact that a user owns a song and has bothered to put it on a device is already an indicator that he/she likes a song (degree of liking). Thus, the above-described measures may also depend on when a song has been transferred to a device.

Once the device of a user A, i.e. a device A, is brought into contact with a device B of a user B, the two devices may start exchanging their fingerprints. Then, device A may find out which songs inside the list of device B are inside the preferred item list (favorite list) on device A, and which songs from the list B are stored on device A. For example, if device B gives a list of forty songs to device A, and device A finds seven of them inside the forty most preferred songs of A itself plus twenty more songs which are stored on A (but not on the preferred list), it would conclude, that the music taste of user B is very similar to the music taste of user A. Conversely, if none of the songs of user B are found on device A, it would conclude that there is little or no similarity between A and B. Then, the information about the similarity between B and A is sent to B. By symmetry, B does exactly the same things.

The received fingerprints of the most preferred songs of B are stored on device A along with the computed similarity between A and B. Note that the similarity computation involves both, the (locally computed) similarity based on the B list relative to the A content and the (received) similarity based on the A list relative to the B content (which has been computed by device B).

When the user connects to the central server, the information about the found relationships is sent to the server, namely, the list of device B, the song content of A, together with the similarity rating between A and B. The server then combines all these similarity relationships which are actually parts of the item-to-item similarity table into one large item-to-item similarity table (global item-to-item matrix), thus removing dependencies from the users altogether.

Of course, the devices memorizes not only one other device (B) but as many as possible, e.g. devices (C, D, E, . . . ).

Although specific embodiments have been illustrated and described herein, it will be appreciated by those of ordinary skill in the art that a variety of ultra net and/or equivalent implementations may be substituted for the specific embodiments shown and described without departing from the scope of the described embodiments. This application is intended to cover any adaptations or variations of the specific embodiments discussed herein. Therefore, it is intended that this invention be limited only by the claims and the equivalents thereof.

The invention claimed is:

1. A method of operating a system for recommendation of a content item, the system including at least a portable first device, a portable second device, and a third device, comprising:
  determining, by the first device, first identifiers descriptive for first content items stored on the first device, the first device assigned to a first user, each first identifier being fingerprint data extracted from audio information contained in one of the first content items;
  determining, by the second device, second identifiers descriptive for second content items stored on the second device, the second device assigned to a second user, each second identifier being fingerprint data extracted from audio information contained in one of the second content items;
  sending the second identifiers from the second device to said first device;
  determining, by said first device, measures for at least a part of the first content items, wherein each measure is associated with a respective content item, wherein the measure is a value that is higher for the respective content item stored in both the first device and the second device than for the respective content item stored in a single one of the first and the second devices;
  sending the measures from the first device to said third device;
  determining or updating, on said third device, an item-to-item matrix based on said measures, wherein said first, second, and third devices are physically separate devices, wherein to each content item the item-to-item matrix assigns a plurality of second measures, and wherein each second measure is assigned to one of other content items and is a value that is high for content items stored in both the first device and the second device, medium for content items stored in a single one of the first and the second devices, and low for content items stored in neither the first nor the second device; and
  determining, by a processor of the third device, a recommendation for the first user, the second user, or another user based on said plurality of second measures assigned to each content item identified by data sent to the third device.

2. The method of claim 1, wherein said determining, by said first device, said measures includes a comparison of user-dependent information stored in the first device and the second device wherein a value of a respective measure is determined to be higher the better the user-dependent information stored in the first and the second devices match.

3. The method of claim 2, wherein said determining, by said first device, said measures includes the comparison of user-dependent information stored in the first device and the second device, wherein said user-dependent information is a user profile, a user gender, a user age, or a user group.

4. The method of claim 1, wherein said determining) by said first device, said measures includes at least a part of said measures that depends on a comparison of a degree of liking of a respective content item.

5. The method of claim 4 further comprising:
  determining said degree of liking based on at least one of a playlist, a favorite list, a purchase date, a purchase price, each being associated with a respective content item, and a number of times a respective content item has been played.

6. The method of claim 1, wherein said determining, by said first device, said measures includes at least a part of said measures that depends on a playlist or a favorite list of a user of the second device.

7. The method of claim 1, 2, 3, 4, 5, or 6, further comprising:
sending the first identifiers from the first device to said second device;
determining, by said second device, measures for at least a part of the second content items, wherein the measure is a value that is higher for the respective content item stored in both the first device and the second device than for the respective content item stored in a single one of the first and the second devices; and
sending the measures from the second device to said third device.

8. A portable device assigned to a user, comprising:
a storage configured to store first content items;
a receiver unit configured to receive second identifiers descriptive for second content items stored on a further device, the further device assigned to a further user, each second identifier being fingerprint data extracted from audio information contained in one of the second content items;
a data processor configured to determine first identifiers descriptive for said first content items, each first identifier being fingerprint data extracted from audio information contained in one of the first content items, and configured to determine measures for at least a part of said first content items, wherein each measure is associated with a respective content item, wherein the measure is a value that is higher for the respective content item stored in both the first device and the second device than for the respective content item stored in a single one of the first and the second devices; and
a transmitter unit configured to send said measures assigned to corresponding first content items to a server, and configured to send a request for a recommendation to said server,
wherein said receiver unit is further configured to receive said recommendation.

9. The portable device of claim 8, wherein said data processor is configured to determine at least a part of said measures on the basis of a comparison of user-dependent information stored in said portable device and said further device, wherein a value of a respective measure is determined to be higher the better the user-dependent information stored in the portable device and the further device match.

10. The portable device of claim 9, wherein said receiver unit is configured to receive said user-dependent information from said further device, and said user-dependent information includes information of a user of said further device.

11. The portable device of claim 9, wherein said receiver unit is configured to receive said user-dependent information that includes a user profile, a user gender, a user age, or a user group.

12. The portable device of claim 8, wherein said data processor is configured to determine at least a part of said measures on the basis of a comparison of a degree of liking of a respective content item.

13. The portable device of claim 12, wherein said data processor is configured to determine at least a part of said measures on the basis of said comparison, wherein said degree of liking is determined based on at least one of a playlist, a favorite list, a purchase date, a purchase price, each associated with a respective content item, and a number of times a respective content item has been played.

14. The portable device of claim 13, wherein said receiver unit is configured to receive said degree of liking from said further device.

15. A server device, comprising:
a receiver unit configured to receive measures for content items, wherein each measure is associated with a respective content item and depends on first and second identifiers, said first and second identifiers being locally determined at a first device assigned to a first user and at a second device assigned to a second user, respectively, and the first and second identifiers being descriptive for first and second content items, respectively, each first identifier being fingerprint data extracted from audio information contained in one of the first content items, each second identifier being fingerprint data extracted from audio information contained in one of the second content items, wherein the measure is a value that is higher for the respective content item stored in both the first device and the second device than for the respective content item stored in a single one of the first and the second devices; and
a data processor configured to determine or update an item-to-item matrix based on said measures, wherein to each content item the item-to-item matrix assigns a plurality of second measures, wherein each second measure is assigned to one of other content items and is a value that is high for content items stored in both the first device and the second device, medium for content items stored in a single one of the first and the second devices, and low for content items stored in neither the first nor the second device, and
wherein said receiver unit is further configured to receive a request for a recommendation and said data processor is further configured to determine said recommendation based on said plurality of second measures assigned to each content item identified by data sent to the server device.

16. A method for determining an item-to-item matrix with at least a first device, a second device, and a third device, comprising:
determining, by the first device, first identifiers descriptive for first content items stored on the first device, the first device assigned to a first user, each first identifier being fingerprint data extracted from audio information contained in one of the first content items;
determining, by the second device, second identifiers descriptive for second content items stored on the second device, the second device assigned to a second user, each second identifier being fingerprint data extracted from audio information contained in one of the second content items;
sending the second identifiers from the second device to said first device;
determining, by said first device, measures for at least a part of the first content items, wherein each measure is associated with a respective content item, wherein the measure is a value that is higher for the respective content item stored in both the first device and the second device than for the respective content item stored in a single one of the first and the second devices;
sending the measures from the first device to said third device; and
determining or updating, by a processor of the third device, said item-to-item matrix based on said measures, wherein said first, second, and third devices are physically separate devices, wherein to each content item the item-to-item matrix assigns a plurality of second measures, and wherein each second measure is assigned to one of other content items and is a value that is high for content items stored in both the first device and the second device, medium for content items stored in a single one of the first and the second devices, and low for content items stored in neither the first nor the second device.

17. The method of claim 16, wherein said determining, by said first device, said measures includes a comparison of user-dependent information stored in the first device and the second device, wherein a value of a respective measure is determined to be higher the better the user-dependent information stored in the first and the second devices match.

18. A non-transitory computer-readable medium including computer program instructions that respectively cause a first device and a second device to execute a method for recommendation of a content item comprising:
   determining first identifiers descriptive for first content items stored on the first device, the first device assigned to a first user, each first identifier being fingerprint data extracted from audio information contained in one of the first content items;
   determining second identifiers descriptive for second content items stored on the second device, the second device assigned to a second user, each second identifier being fingerprint data extracted from audio information contained in one of the second content items;
   sending the second identifiers from the second device to said first device;
   determining, by said first device, measures for at least a part of said first content items, wherein each measure is associated with a respective content item, wherein the measure is a value that is higher for the respective content item stored in both the first device and the second device than for the respective content item stored in a single one of the first and the second devices;
   sending the measures to a third device to determine or update, on said third device, an item-to-item matrix based on said measures, wherein said first, second, and third devices are physically separate devices, wherein to each content item the item-to-item matrix assigns a plurality of second measures, and wherein each second measure is assigned to one of other content items and is a value that is high for content items stored in both the first device and the second device, medium for content items stored in a single one of the first and the second devices, and low for content items stored in neither the first nor the second device; and
   receiving a recommendation for the first user.

19. The non-transitory computer-readable medium including computer program instructions of claim 18, wherein said determining, by said first device, said measures includes a comparison of user-dependent information stored in the first device and the second device, wherein a value of a respective measure is determined to be higher the better the user-dependent information stored in the first and the second devices match.

* * * * *